Aug. 13, 1963
G. VON HACHT
3,100,847
LIGHT CURTAIN APPARATUS FOR PHOTOSENSITIVE DETECTOR
Filed Jan. 18, 1961
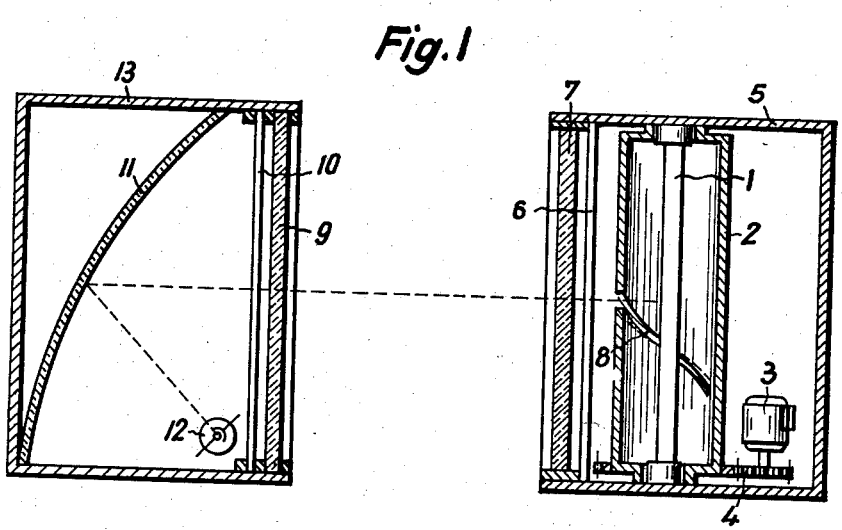
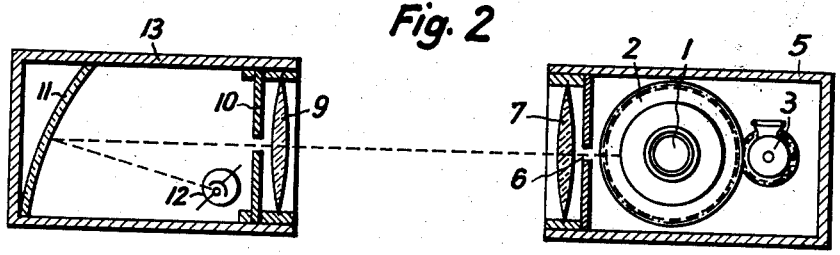
Inventor:
GERHARD VON HACHT
By Toulmin & Toulmin
Attorneys

United States Patent Office 3,100,847
Patented Aug. 13, 1963

3,100,847
LIGHT CURTAIN APPARATUS FOR PHOTO-SENSITIVE DETECTOR
Gerhard von Hacht, Frankfurt am Main, Germany, assignor to Licentia Patent - Verwaltungs - G.m.b.H., Frankfurt am Main, Germany
Filed Jan. 18, 1961, Ser. No. 83,397
Claims priority, application Germany Jan. 19, 1960
6 Claims. (Cl. 250—237)

The present invention relates to an apparatus for producing a curtain of light, more particularly to an improvement in producing a curtain of light for use as a protective element in machinery such as presses, punches and so forth.

Various arrangements have been previously devised to form a light curtain for use as a protective element in machinery. In a light curtain a beam of light is usually oscillated back and forth in a plane so that a single beam of light will cover a planar area of a substantial width. This planar area is essentially a curtain of light. If an object is interposed within this curtain of light so as to disrupt the passage of the beam even momentarily the total amount of light for the curtain is reduced and this reduction of light is registered to indicate the presence of a foreign object or may be used to actuate on an alarm.

One form of the known apparatus oscillates a light ray by means of an oscillating mirror. The light ray is projected from a source of light to a bevel mirror and from there onto a mirror having triple reflecting surfaces. Because of the scattering of the light on its path the light is not reflected in a focussed beam to this source but is scatered on all sides of the source. An annular mirror is positioned around the light source to catch the scattered light beams and project them onto a light-sensitive element. As long as the light curtain formed by the oscillating beam of light is not interrupted, the light-sensitive element will continuously receive light and the device to which this arrangement is connected will remain operating.

Another common arrangement comprises the use of a rotary polygonal reflector prism. The rotary axis of such a prism is arranged parallel to the focal line of a concave cylindrical mirror and the prism is so dimensioned that during rotation thereof the reflecting surfaces of the prism essentially coincide with the focal line of the cylindrical mirror. The light rays are projected from a light source to the reflecting prism from which they are reflected onto the cylindrical mirror and then subsequently pass through a cylindrical lens to a triple reflecting mirror from which they are reflected through a semi-transparent reflector onto a light-sensitive element.

The disadvantage of the prior art arrangements of which the above two embodiments are examples is that it is necessary to use oscillating or multiple polygonal mirrors together with triple reflectors all of which must be made with great precision and accuracy.

In addition, in the second of the above-described arrangements it is necessary to use an additional semi-transparent mirror.

It is therefore the principal object of this invention to provide a novel and improved apparatus for producing a curtain of light.

It is another object of this invention to provide an improved apparatus for emitting a beam of light which oscillates in a plane to form a curtain of light.

It is a further object of this invention to provide an improved apparatus for producing a curtain of light without the necessity for employing oscillating mirrors or rotating reflecting prisms.

It is an additional object of this invention to provide an apparatus wherein the number of reflecting surfaces is reduced to only one so as to eliminate the possible inaccuracies and sources of light disturbance.

The above objects are obtained in the present invention which essentially comprises a light source surrounded by a rotating cylindrical casing in which is provided a helical slit. A slit diaphragm provided with a slit optical prism is then disposed between the cylinder and the light receiver.

The light source may comprise a fluorescent tube. If a light source having a high intensity of illumination is required, an incandescent helical tubular lamp can be employed as the light source.

The rotary cylindrical casing may have a plurality of helical light slits if a light curtain of high intensity is required.

As an alternative the cylindrical casing may be formed from a transparent material. A foil having a helical-shaped transparent passage is then wound about the outer periphery of the cylindrical casing. The effect is to provide a cylindrical casing having a helical light slit therein.

The light rays which pass through the helical slit of the cylindrical casing subsequently pass through a slit diaphragm and a slit optical system to be received by a collimator reflector which reflects the rays onto a light-sensitive element. The light-sensitive element may also be a light-responsive element and may comprise a photoelectric cell. In some instances a photoemissive diode or a photosensitive semi-conductor may be used as the light-sensitive element.

Additional objects and advantages of this invention will become apparent upon reference to the accompanying description when taken in conjunction with the following drawings, wherein FIGURE 1 is a side elevational view of the apparatus of this invention showing both the light emitter and the light receiver; and FIGURE 2 is a top plan view of the arrangement illustrated in FIGURE 1.

A specific embodiment of the present invention will be described with reference to the above-mentioned drawings. In FIGURE 1 the light emitter comprises a light source 1 which is surrounded by a rotatably mounted cylindrical casing 2. The casing 2 has a gear on one end thereof, which, in turn, meshes with a gear 4 driven by a motor 3 which rotates at a constant speed.

A housing 5 encloses the light source 1, cylinder 2 and motor 3 and is provided with a slit diaphragm 6 through which light beams passing through the cylinder 2 can emerge. A cylindrical lens 7 is mounted in front of the slit diaphragm 6 and provides a slit optical system to collect and concentrate the light emerging from the slit diaphragm.

The cylindrical casing 2 has a helical light slit 8 therein.

When the cylinder 2 is stationary, a point of light forms at the intersection of the slit diaphragm 6 and the helical slit 8 on the casing. As the cylinder rotates the light point moves along the slit diaphragm 6 to form a light curtain.

If the casing 2 is provided with a plurality of helical light slits, a plurality of light points is then formed on the slit diaphragm 6. Rotation of the cylinder will cause the plurality of light points to move back and forth along the slit diaphragm to form a light curtain of greater intensity of illumination than when a single point of light is used.

The light rays emerging from the cylindrical lens 7 of the light emitter are projected onto a light receiver which comprises a concentrating cylindrical lens 9 and a slit diaphragm 10. A collimater mirror 11 is located behind the slit diaphragm and projects the light rays onto a light-sensitive element 12. The components of the light receiver are enclosed by a casing 13.

The light-sensitive element may comprise either a photoelectric cell, a photoemissive diode or a photosensitive semi-conductor such as a transistor. Where a photoemissive diode is used, a voltage may be produced which is a function of the light received by the diode. In addition, the diode may be used as a variable resistance.

The photosensitive semi-conductors can be advantageously used because of their amplifying effect which would be of great assistance is operating sensitive switch arrangements.

In the operation of the above-described arrangement a curtain of light is formed by the moving of the light beam back and forth along the slit diaphragm 6. The moving of the light beam will form a light curtain. If any object is interposed in the light curtain the total quantity of light received by the light-sensitive element will vary and, accordingly, a switching circuit will be actuated. This switching circuit, which may comprise various amplifying elements, may control switching arrangements for stopping the machinery or for sounding an alarm or warning.

Thus it can be seen that the present invention discloses a simple yet effective light-emitting structure by producing a curtain of light.

The reduction in the number of reflecting surfaces required eliminates disturbances from outside light sources and also considerably reduces the cost of operating such an arrangement.

It will be understood that this invention is susceptible to modifications in order to adapt it to different usages and conditions and, accordingly, it is desired to comprehend such modifications within this invention as may fall within the scope of the appended claims.

What I claim is:

1. An arrangement for producing a protective light curtain, the combination comprising: a first casing having a straight slot; a cylindrical lens in front of said slot; a second cylindrical casing inside said first casing and having at least one helical shaped slot; an elongated light source axially and centrally disposed in said second casing and aligned with said cylinder lens and said straight slot and defining therewith the plane of extension of the light curtain; means for rotating said second casing; a third casing disposed spatially apart from said first casing and having a straight slot aligned with said curtain; a photoelectric receiver in said third casing; an optical system in said third casing optically aligned with the slot thereof and including a cylindrical lens and a collimator mirror curved in two planes and reflecting any light beam entering said third casing from said light source onto said photoelectric receiver.

2. In an arrangement for producing a curtain of light as claimed in claim 1 wherein said light source comprises a fluorescent tube.

3. In an arrangement for producing a curtain of light as claimed in claim 1 wherein said light source comprises an incandescent helical tubular lamp.

4. In an arrangement for producing a curtain of light as claimed in claim 1, said photoelectric receiver comprising a photoelectric cell.

5. In an arrangement for producing a curtain of light as claimed in claim 1 wherein said photoelectric receiver comprises a photoemissive diode.

6. In an arrangement for producing a curtain of light as claimed in claim 1 wherein said photoelectric receiver comprises a photosensitive semi-conductor.

References Cited in the file of this patent
UNITED STATES PATENTS

| | | |
|---|---|---|
| 2,082,941 | Burnside | June 8, 1937 |
| 2,371,963 | La Pierre | Mar. 20, 1948 |
| 2,548,783 | Goldsmith | Apr. 10, 1951 |
| 2,769,374 | Sick | Nov. 6, 1956 |
| 2,964,240 | Brinster et al. | Dec. 13, 1960 |